United States Patent Office
3,505,331
Patented Apr. 7, 1970

3,505,331
PROCESS FOR PREPARING 2,4-DIAMINO-7-CHLOROPYRIDO(2,3-d)PYRIMIDINES
George H. Hitchings, Yonkers, and Bernard S. Hurlbert, Tarrytown, N.Y., assignors to Burroughs Wellcome & Co. (U.S.A.) Inc., Tuckahoe, N.Y., a corporation of New York
No Drawing. Continuation-in-part of application Ser. No. 424,177, Jan. 8, 1965. This application Nov. 22, 1967, Ser. No. 684,940
Claims priority, application Great Britain, Jan. 10, 1964, 1,317/64
Int. Cl. C07d 57/20
U.S. Cl. 260—256.4         3 Claims

ABSTRACT OF THE DISCLOSURE

A process for preparing compounds useful as intermediates for the preparation of compounds having antibacterial activity. In particular, this invention is directed to a process for the preparation of compounds of the formula

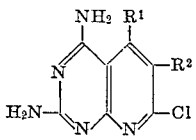

wherein $R^1$ is selected from the class consisting of hydrogen, phenyl and lower alkyl and $R^2$ is selected from the class consisting of hydrogen, lower alkyl and aralkyl having 7 to 8 carbon atoms, which comprises (a) mixing a compound of the formula

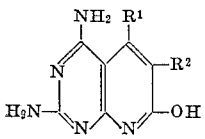

with an excess of N,N'-dimethyl formamide, (b) then adding an excess of thionyl chloride to the mixture, and (c) then hydrolyzing the product of step (b).

SPECIFICATION

This application is a continuation-in-part of U.S. patent application Ser. No. 424,177 filed Jan. 8, 1965, now abandoned.

This invention relates to 2,4-diamino-7-chloropyrido-(2,3-d)pyrimidines of Formula I, their production and their biological activity.

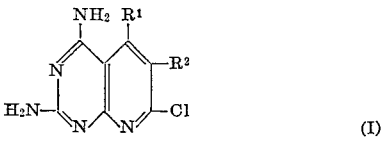

In this and subsequent formulae, $R^1$ is hydrogen phenyl or lower alkyl and $R^2$ is hydrogen alkyl or substituted or unsubstituted aralkyl, or $R^1$ and $R^2$ together form a divalent aliphatic hydrocarbon chain.

Some of the 7-chloro compounds of Formula I have been described in British specification 913,710 published Dec. 28, 1962, as well as in U.S. Patent 2,937,284 issued May 17, 1962, as valuable intermediates in the conversion of 7-hydroxy compounds of Formula II into 7-unsubstituted compounds of Formula III which have antibacterial activity; the reaction sequence employed is shown below.

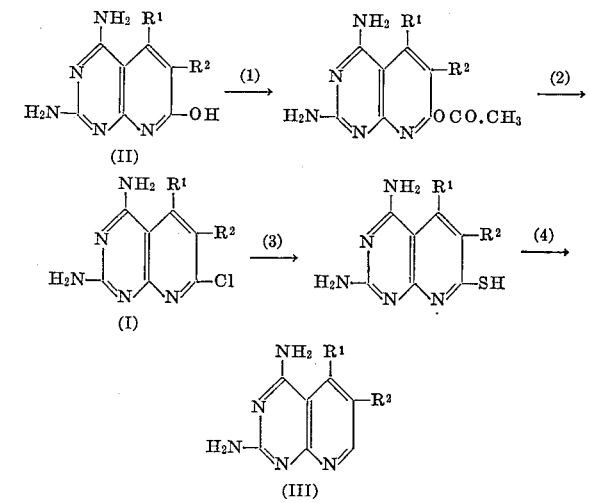

(1) heat under reflux in acetic acid contained acetic anhydride;
(2) heat under reflux in phosphoryl chloride and neutralize with ammonia;
(3) heat in a bomb with sodium hydrosulphide; and
(4) dethiolation with Raney nickel catalyst.

This reaction sequence suffers from a major defect, in that chlorination by conventional means (using phosphoryl chloride) imposes group of the Formula A $$\begin{matrix} O \\ \| \\ P=Cl_2 \\ | \\ NH \\ | \end{matrix} \qquad (A)$$

at the 2 and 4 positions on the pyrimidine moiety of the molecule. Even in the case where step (1) above is skipped the above phosphorus groups of Formula A appear at the 2, 4 positions. After hydrolysis, it has been generally found in practice, that only one of the groups of the Formula A has been removed from the pyrimidine moiety and the other remains as a compound of Formula A with OH substituted for Cl and, accordingly, with the above-mentioned process, only very small amounts of the desired end product were obtained in a pure form.

It has now been found that a 2,4-diamino-7-chloropyrido(2,3-d)pyrimidine of Formula I can be readily made in a pure and usable form, by (a) mixing a 2,4-diamino-7-hydroxy-pyrido(2,3-d)pyrimidine of Formula II with an excess of N,N'-dimethyl formamide, (b) adding an excess of thionyl chloride to the mixture of step (a), and then (c) hydrolyzing the product of step (b).

The term "excess" as used herein, is meant as three or more moles (preferably at least 5), N,N'-dimethyl formamide (DMF) and thionyl chloride per one mole of the 2,4-diamino - 7 - hydroxypyrido(2,3-d)pyrimidine of Formula II. If less than an excess of DMF and thionyl chloride are used in the process, it has been found that the process is not operable.

In addition, unless the reactants are added as noted above, (first DMF and the pyrimidine of Formula II and then the thionyl chloride) it has been found that the reaction does not produce the desired end product, even after hydrolysis, in usable yields.

It appears, experimentally, that the DMF reacts with the thionyl chloride to produce an ammonium chloride compound which then reacts with the NH₂ groups at the 2 and 4 positions to produce unwanted formamide groups at the 2, 4 positions which are not easily removed by hydrolysis.

Due to the rate of reaction between the thionyl chloride and the pyrimidine of Formula II, and the rate of reaction of DMF and thionyl chloride, by adding the reactants in the manner described, unwanted side products which cannot be removed by hydrolysis at the 2 and 4 positions on the pyrimidine moiety are avoided.

Thus, with this new procedure, usable yields of 7-unsubstituted compounds of Formula III have thereby become a practical procedure.

It has also been discovered that the 2,4-diamino-7-chloropyrido(2,3-d)pyrimidines of Formula I, which have not previously been reported to have any biological activity, are themselves highly active as antibacterial agents. In addition, they potentiate the activity of the sulphanilamides and are particularly valuable when used in combination with the latter, both in topical and systemic applications.

For example, 2,4-diamino-6-s-butyl-7-chloro-5-methylpyrido(2,3-d)pyrimidine at 4.6 mg./kg. plus sulphadiazine at 3.3 mg./kg. was effective in mice infected with *Klebsiella pneumoniae*, a Gram-negative bacterium that may cause pneumonia and other infections of the respiratory, intestinal and urinary tracts, and the therapeutic index of the 2,4-diamino-6-s-butyl-7-chloro - 5 - methylpyrido(2,3-d)pyrimidine was greater than 13.

The 2,4-diamino-7-chloropyrido(2,3-d)pyrimidines of Formula I may be presented for antibacterial use in association with a pharmaceutically acceptable carrier. The compound may advantageously be presented in discrete units, such as tablets, capsules, cachets, ampoules or suppositories, each containing a predetermined amount of the compound. It may also be presented as a powder or granules, as a solution or suspension in an aqueous, nonaqueous or emulsified liquid, or as an ointment. For parenteral use, the formulations of this invention may be made by any of the methods of pharmacy, and may include one or more of the following accessory ingredients: diluents, solutes, buffers, flavoring, binding, dispersing, surface-active, thickening, lubricating and coating materials, preservatives, antioxidants, bacteriostats, suppository and ointment bases, and any other acceptable excipients.

The following examples illustrate the invention.

EXAMPLE 1

2,4-diamino-6-benzyl-7-hydroxy-5-methylpyrido(2,3-d)pyrimidine

In a 2-liter flask equipped with a stirrer, thermometer in the reaction mixture and still head was placed 250 g. (2.05 mole) of 2,4,6-triaminopyrimidine, 450 g. (2.05 mole) of ethyl α-benzylacetoacetate and 1600 ml. of diphenyl ether. The flask was heated, with stirring, at 215–235° until distillation of ethanol and water subsided. The reaction mixture was cooled to room temperature and an equal volume of hexane added. The mixture was filtered and washed with hexane. The precipitate was slurried in one liter of water at 90–100°, filtered while hot and washed with methanol. M.P. 300° (dec.), yield=332 g. (58 percent), ultraviolet absorption spectra (10 mg./l., 1 cm.), pH 1: maximum, 321 m$\mu$; optical density, 0.480; pH 11: maximum, 327m$\mu$; optical density, 0.305.

EXAMPLE 2

2,4-diamino-6-benzyl-7-chloro-5-methylpyrido(2,3-d)pyrimidine

In a 200 ml. flask fitted with a stirrer, reflux condenser and dropping funnel was placed 2.81 g. (0.01 mole) of 2,4-diamino-6-benzyl-7-hydroxy-5 - methylpyrido(2,3-d)pyrimidine, 7.3 g. (0.1 mole) of N,N-dimethylformamide, and 25 ml. of chloroform. The mixture was stirred and 11.9 g. (0.1 mole) of thionyl chloride was added dropwise. The mixture was then boiled for two hours, concentrated in vacuo to a viscous liquid and cooled. This was dissolved in sufficient 95 percent ethanol to make a mobile solution, and 29 percent aqueous ammonia was added dropwise, with vigorous stirring, keeping the temperature below 20° C. until a pH value of 9–10 was reached. This mixture was allowed to stand 18 hours at 0–10° C. and was then filtered. The precipitate was washed thoroughly with water and recrystallized from 70 percent ethanol to yield 1.30 g. (43 percent) of product, melting at 326° C. (uncorrected). Found: C, 60.30; H, 5.38; N, 23.37; $C_{15}H_{14}N_5Cl$ requires: C, 60.10; H, 4.71; N, 23.36 percent.

EXAMPLE 3

2,4-diamino-6-benzyl-7-mercapto-5-methylpyrido(2,3-d)pyrimidine

At saturated solution of ammonium hydrosulphide was prepared by passing hydrogen sulphide gas into a cold 8 percent aqueous ammonia solution. 2 g. (0.0067 moles) of 2,4-diamino-6-benzyl-7-chloro-5-methylpyrido(2,3 - d) pyrimidine and 100 ml. of the ammonium hydrosulphide solution were heated in a steel bomb at 120° C. for 2 hours. The bomb was cooled and the contents filtered. The precipitate was recrystallized from 70 percent ethanol to yield 1.05 g. (52 percent) of a yellow product. Found: C, 58.92; H, 5.17; N, 21.88 percent; $C_{15}H_{15}N_5S\cdot\frac{1}{2}H_2O$ requires: C, 58.80; H, 5.26; N, 22.86. This mercapto compound could be dethiolated by means of Raney nickel to yield 2,4-diamino-6-benzyl - 5 - methylpyrido(2,3 - d) pyrimidine.

EXAMPLE 4

2,4,7-triamino-6-benzyl-5-methylpyrido(2,3-d)pyrimidine 4.24 g. (0.014 mole) of 2,4-diamino-6-benzyl-7-chloro-5-methylpyrido(2,3-d)pyrimidine and 150 ml. of a saturated solution of ammonia in absolute ethanol were placed in a steel bomb and heated at 160° C. for 20 hours. The bomb was cooled, the contents filtered, and the precipitate washed well with water. It was then recrystallized from 50 percent ethanol to yield 1.10 g. (25 percent) of white hydrochloride half hydrate. Found: C, 55.11; H, 5.45; N, 24.99 percent; $C_{15}H_{16}N_6\cdot HCl\cdot\frac{1}{2}H_2O$ requires: C, 55.29; H, 5.57; N, 25.80 percent.

EXAMPLE 5

2,4-diamino-7-hydroxy-5-methyl-6-p-methylbenzylpyrido(2,3-d)pyrimidine

Using the procedure described in Example 1, 93.8 g. (56 percent of theory) of 2,4-diamino-7-hydroxy-5-methyl-6-p - methylbenzylpyrido(2,3-d)pyrimidine was prepared from 133.3 g. (0.570 mole) of ethyl α-p-methylbenzylacetoacetate and 71.2 g. (0.570 mole) of 2,4,6-triaminopyrimidine in 400 ml. of diphenyl ether. Found: C, 65.12; H, 5.83; N, 23.10 percent; $C_{16}H_{17}N_5O$ requires: C, 65.06; H, 5.80; N, 23.71 percent.

EXAMPLE 6

2,4-diamino-7-chloro-5-methyl-6-p-methylbenzyl pyrido(2,3-d)pyrimidine

According to the procedure described in Example 2, 29.53 g. (0.10 mole) of 2,4-diamino-7-hydroxy-5-methyl-6-p-methylbenzylpyrido(2,3-d)pyrimidine in 200 ml. of chloroform was treated with 73.0 g. (1.0 mole) of N,N-dimethylformamide and 119.0 g. (1.0 mole) of thionyl chloride. 45.1 g. of crude product was obtained after washing with 2 N sodium hydroxide solution and water. This crude material was used directly in subsequent reactions.

EXAMPLE 7

2,4-diamino-7-mercapto-5-methyl-6-p-methylbenzylpyrido(2,3-d)pyrimidine

As described in Example 3, 18.3 g. of crude 2,4-diamino-7-chloro-5-methyl-6-p - methylbenzylpyrido(2,3-d)

pyrimidine was heated with a saturated solution of ammonium sulphite at 130° C. for 6 hours. 10.5 g. (58 percent), based on pure starting material) of yellow 2,4-diamino-7-mercapto-5-methyl-6 - p - methylbenzylpyrido(2,3-d)pyrimidine was obtained. The ultraviolet spectrum shows a maximum at 388 m$\mu$ in pH 1 solution. This product could be dethiolated with Raney nickel to yield 2,4-diamino-5-methyl-6 - p - methylbenzylpyrido(2,3-d)pyrimidine.

EXAMPLE 8

2,4,7-triamino-5-methyl-6-p-methylbenzylpyrido(2,3-d)pyrimidine

As described in Example 4, 14.1 g. of crude 2,4-diamino-7-chloro-5-methyl-6 - p - methylbenzylpyrido(2,3-d)pyrimidine (Example 6) was heated with 150 ml. of a saturated solution of ammonia in absolute alcohol at 160° C. for 18 hours to yield 3.45 g. (22 percent) of the recrystallized hydrochloride hydrate of the product. Found: C, 55.58; H, 5.75; N, 23.86 percent; $C_{16}H_{18}N_6.HCl.H_2O$ requires: C, 55.09; H, 6.06; N, 24.09 percent.

EXAMPLE 9

2,4-diamino-6-p-chlorobenzyl-7-hydroxy-5-methyl-pyrido(2,3-d)pyrimidine

As described in Example 1, 41.2 g. (45 percent yield) of 2,4-diamino-6 - p - chlorobenzyl-7-hydroxy-5-methylpyrido(2,3-d)pyrimidine, M.P. 392–4° C. (uncorrected), was prepared from 75.0 g. (0.294 mole) of ethyl α-p-chlorobenzylacetoacetate and 36.8 g. (0.294 mole) of 2,4,6-triaminopyrimidine in 150 ml. of diphenyl ether. Found: C, 57.06; H, 4.39; N, 22.26 percent; $C_{15}H_{14}N_5OCl$ requires: C, 57.05; H, 4.47; N, 22.18 percent.

EXAMPLE 10

As described in Examples 2 and 6, 96 g. of crude 2,4-diamino-7-chloro - 6 - p-chlorobenzyl-5-methylpyrido(2,3-d)pyrimidine was obtained from reaction of 63.2 g. (0.20 moles) of 2,4-diamino-6-p-chlorobenzyl-7-hydroxy-5-methylpyrido(2,3-d)pyrimidine in 400 ml. of chloroform with 146 g. (2.0 mole) of N,N-dimethylformamide and 238 g. (2.0 mole) of thionyl chloride. This crude compound was used directly in subsequent reactions.

EXAMPLE 11

2,4-diamino-6-p-chlorobenzyl-7-mercapto-5-methyl-pyrido(2,3-d)pyrimidine

As described in Example 7, 27 g. of 2,4-diamino-6-p-chlorobenzyl-7-mercapto - 5 - methylpyrido-(2,3-d)pyrimidine was obtained by reaction of 50 g. of the crude material described in Example 10 with ammonium hydrosulphide. Ultraviolet absorption spectra, pH 1: maximum, 385 m$\mu$; pH 11: maxima, 231, 373 m$\mu$. This compound could be dethiolated by Raney nickel to give 2,4-diamino-6-p-chlorobenzyl - 5-methylpyrido-(2,3-d)pyrimidine.

EXAMPLE 12

2,4-diamino-6-sec-butyl-7-hydroxy-5-methylpyrido(2,3-d)pyrimidine

As described in Example 1, 52.2 g. (20 percent) of 2,4-diamino-6-sec-butyl - 7 - hydroxy-5-methylpyrido(2,3-d)pyrimidine was obtained from 193.7 g. (1.04 mole) of ethyl α-sec-butylacetoacetate and 130 g. (1.04 mole) of 2,4,6-triaminopyrimidine in 1 l. of diphenyl ether.

EXAMPLE 13

2,4-diamino-6-sec-butyl-7-chloro-5-methylpyrido(2,3-d)pyrimidine

As described in Example 3, 9.1 g. (64 percent) of 2,4-diamino-6-sec-butyl-7-chloro - 5 - methylpyrido(2,3-d)pyrimidine was obtained from 12.40 g. (0.05 mole) of 2,4-diamino-6-sec-butyl - 7 - hydroxy-5-methylpyrido(2,3-d)pyrimidine, 59.5 g. (0.50 mole) of thionyl chloride and 36.5 g. (0.50 mole) of N,N-dimethylformamide in 200 ml. of chloroform. Found: N, 24.99 percent; $C_{12}H_{16}N_5Cl.H_2O$ requires: N, 24.68 percent.

EXAMPLE 14

2,4-diamino-6-sec-butyl-7-mercapto-5-methyl-pyrido(2,3-d)pyrimidine

As described in Example 3, 9.40 g. (69 percent) of 2,4-diamino-6-sec-7-mercapto - 5 - methylpyrido(2,3-d)pyrimidine was obtained by thiolation of 13.80 g. (0.052 mole) of 2,4-diamino-6 - sec-butyl-7-chloro-5-methylpyrido(2,3-d)pyrimidine. In pH 1 solution the ultraviolet spectrum shows maxima at 391 and 297 m$\mu$. This compound could be dethiolated by Raney nickel to 2,4-diamino-6-sec-butyl - 5 - methylpyrido(2,3-d)pyrimidine.

EXAMPLE 15

2,4-diamino-6-amyl-7-chloro-5-methylpyrido(2,3-d)pyrimidine

From 165.8 g. (0.634 mole) of 2,4-diamino-6-amyl-7-hydroxy-5-methylpyrido(2,3-d)pyrimidine, prepared as in Example 1, 462 g. (6.34 mole) of N,N-dimethylformamide and 754 g. (6.34 moles) of thionyl chloride in 1 l. of chloroform was obtained 122.2 g. (64 percent) of 2,4-diamino - 6 - amyl - 7 - chloro-5-methylpyrido(2,3-d)pyrimidine by the method described in Example 2. The compound was not recrystallized.

EXAMPLE 16

2,4-diamino-6-amyl-7-mercapto-5-methylpyrido(2,3-d)pyrimidine

By the method described in Example 3, 20.4 g. (34 percent) of 2,4-diamino-6-amyl-7-mercapto-5-methylpyrido(2,3-d)pyrimidine was obtained from 60 g. of the 2,4 - diamino - 6 - amyl-7-chloro-5-methylpyrido(2,3-d)pyrimidine obtained in Example 15. Ultraviolet absorption spectra, pH 1: maxima, 293, 394 m$\mu$; pH 11: maxima, 235, 372 m$\mu$. This compound could be dethiolated to 2,4-diamino-6-amyl-5-methylpyrido(2,3-d)pyrimidine.

EXAMPLE 17

2,4-diamino-7-hydroxy-5-phenylpyrido(2,3-d)pyrimidine

By the method described in Example 1, 52.2 g. (39 percent) of 2,4-diamino-7-hydroxy-5-phenylpyrido(2,3-d)pyrimidine hydrate was obtained from 96.1 g. (0.5 mole) of ethyl benzoylacetate and 62.5 g. (0.5 mole) of 2,4,6-triaminopyrimidine in 400 ml. of diphenyl ether. Found: N, 26.80 percent; $C_{13}H_{11}N_5O.H_2O$ requires: N, 26.71 percent.

EXAMPLE 18

2,4-diamino-7-chloro-5-phenylpyrido(2,3-d)pyrimidine

By the method described in Example 2, 21.9 g. of 2,4-diamino - 7-chloro-5-phenylpyrido(2,3-d)pyrimidine was obtained from 25.3 g. (0.1 mole) of 2,4-diamino-7-hydroxy-5-phenylpyrido(2,3-d)pyrimidine, 73.0 g. (1.0 mole) of N,N-dimethylformamide and 119 g. (1.0 mole) of thionyl chloride in 200 ml. of chloroform. This product was not recrystallized.

EXAMPLE 19

2,4,7-triamino-5-phenylpyrido(2,3-d)pyrimidine

By the method described in Example 4, 10.0 g. of 2,4-diamino-7-chloro-5-phenylpyrido(2,3-d)pyrimidine gave, after recrystallization of the product from aqueous ethanol which was acidified with hydrochloric acid, 2.46 g. (22 percent) of 2,4,7-triamino-5-phenylpyrido(2,3-d)

pyrimidine hydrochloride hydrate, melting at 316–7° C. (uncorrected). Found: C, 51.17; H, 5.13; N, 27.15 percent; $C_{13}H_{12}N_6 \cdot HCl \cdot H_2O$ requires: C, 5090; H, 4.93; N, 27.40 percent.

What we claim is:

1. A process for the preparation of compounds of the formula

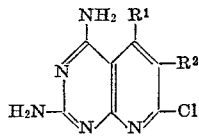

wherein $R^1$ is selected from the class consisting of hydrogen, phenyl and lower alkyl and $R^2$ is selected from the class consisting of hydrogen, lower alkyl and aralkyl having 7 to 8 carbon atoms, which comprises (a) mixing a compound of the formula

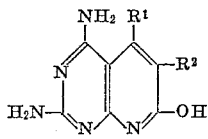

with an excess of N,N'-dimethyl formamide, (b) then adding an excess of thionyl chloride to the mixture, and (c) then hydrolyzing the product of step (b).

2. A process for the preparation of compounrs of the formula

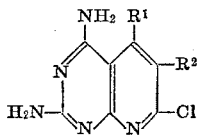

wherein $R^1$ is selected from the class consisting of hydrogen and lower alkyl and $R^2$ is selected from the class consisting of lower alkyl and p-methylbenzyl and benzyl, which comprises (a) mixing a compound of the formula

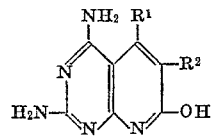

to an excess of N,N'-dimethylformamide, (b) then adding an excess of thionyl chloride, and (c) then hydrolyzing the product of step (b).

3. A process according to claim 1, in which the aralkyl is substituted with a member selected from the class consisting of chloro and lower alkyl.

References Cited

UNITED STATES PATENTS 2,937,284   5/1960   Hitchings et al. ____ 260—256.4

FOREIGN PATENTS 1,434,200   2/1966   France.

OTHER REFERENCES

Eilingsfeld et al.: Anggwandte Chomie, vol. 72 (1960), pp. 836–9.

ALEX MAZEL, Primary Examiner

R. J. GALLAGHER, Assistant Examiner

U.S. Cl. X.R.

260—256.5; 424—229, 251